United States Patent [19]
Karpinsky et al.

[11] Patent Number: 5,673,784
[45] Date of Patent: Oct. 7, 1997

[54] PLURAL PREFORMED BELT CONVEYOR CORNER TURN

[75] Inventors: James L. Karpinsky; Todd A. Cibulka, both of Poynette, Wis.

[73] Assignee: Food Process Systems, Inc., Lodi, Wis.

[21] Appl. No.: 516,381

[22] Filed: Aug. 17, 1995

[51] Int. Cl.⁶ ........................................ B65G 15/02
[52] U.S. Cl. ............................... 198/831; 198/817
[58] Field of Search .......................... 198/817, 831

[56] References Cited

U.S. PATENT DOCUMENTS

| | | | |
|---|---|---|---|
| 23,878 | 5/1859 | Wood. | |
| 1,206,305 | 11/1916 | Cowley. | |
| 1,476,936 | 12/1923 | Walden. | |
| 2,260,587 | 10/1941 | Shields | 198/109 |
| 2,713,413 | 7/1955 | Douglass | 198/817 |
| 2,880,847 | 4/1959 | Kelley | 198/109 |
| 2,957,572 | 10/1960 | Dvorak | 198/817 |
| 3,252,200 | 5/1966 | Gulde et al. | 25/142 |
| 3,289,818 | 12/1966 | Kittredge | 198/190 |
| 3,635,328 | 1/1972 | Burkholder | 198/817 |
| 3,840,111 | 10/1974 | Randrup | 198/190 |
| 3,912,072 | 10/1975 | Kornylak | 198/183 |
| 3,997,048 | 12/1976 | Hardy | 198/817 |
| 4,013,165 | 3/1977 | Bush | 198/817 |
| 4,230,223 | 10/1980 | Flajnik | 198/817 |
| 4,556,143 | 12/1985 | Johnson | 198/841 |
| 5,052,548 | 10/1991 | Andrews | 198/817 |
| 5,067,608 | 11/1991 | McLellan | 198/817 |
| 5,168,978 | 12/1992 | Cox et al. | 198/369 |
| 5,259,495 | 11/1993 | Douglas | 198/404 |
| 5,332,082 | 7/1994 | Sommerfield | 198/817 |

FOREIGN PATENT DOCUMENTS

| | | |
|---|---|---|
| 2048289 | 2/1992 | Canada. |
| 0469570 | 2/1992 | European Pat. Off.. |
| 2203902 | 8/1972 | Germany. |
| 1058837 | 12/1983 | U.S.S.R.. |
| 287294 | 4/1928 | United Kingdom. |
| 339465 | 1/1931 | United Kingdom. |
| 2 220 903 | 5/1988 | United Kingdom. |

*Primary Examiner*—William E. Terrell
*Assistant Examiner*—Khoi H. Tran
*Attorney, Agent, or Firm*—Lathrop & Clark

[57] ABSTRACT

A plurality of reinforced urethane belts define a conveyor path which changes direction for causing conveyed articles to turn a corner. Two sets of corner pulleys are mounted as part of a conveyor assembly which is cantilevered out over a rigid frame. Return pulleys are mounted to the frame beneath the corner pulleys. Continuous looped belts which have been preformed to a desired length, different for each set of corner pulleys, are installed on the corner turn by being passed over the projecting cantilevered conveyor assembly and fitted to the corner pulleys and a return pulley. The return pulleys move radially in slots and are tightened in place to achieve the desired belt tension.

10 Claims, 4 Drawing Sheets

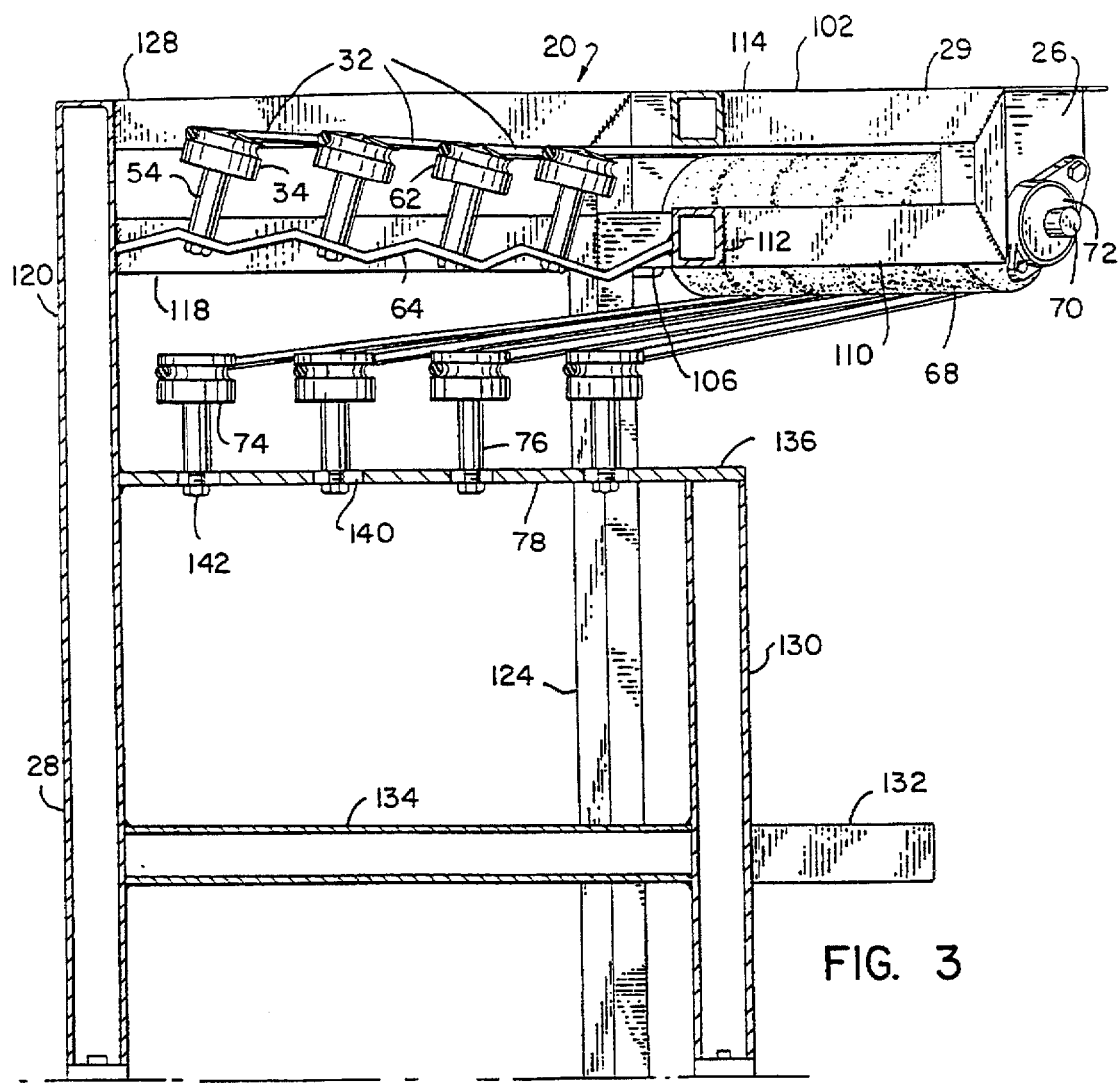
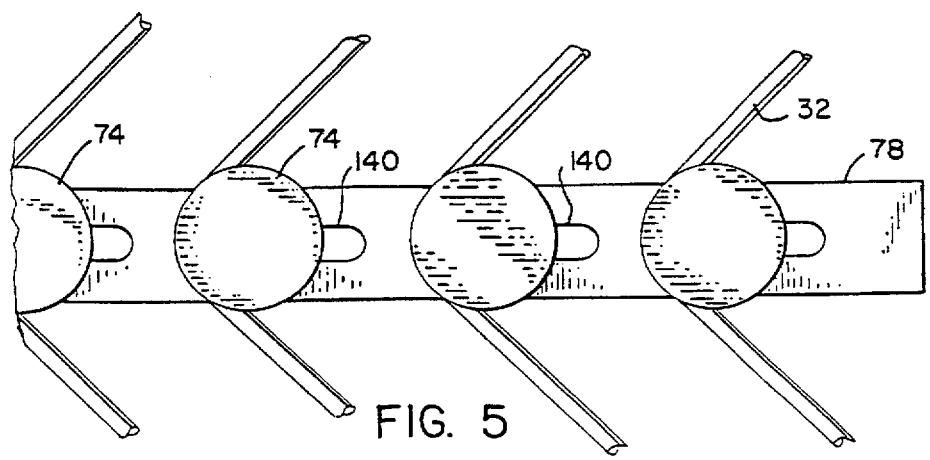

PLURAL PREFORMED BELT CONVEYOR CORNER TURN

FIELD OF THE INVENTION

The present invention relates to conveyors in general, and to conveyors which move articles around a corner in particular.

BACKGROUND OF THE INVENTION

Modern production lines, in which multiple operations are performed at separated stations to produce a finished article, require conveyors to advance the work piece or product from one station to another. Conveyors carry the product as it is produced or assembled, and then carry the product for packaging and eventual discharge to storage or a shipping point. To most effectively make use of production floor space, it is often desirable to cause the product to turn a corner or to reverse its direction of travel. The conveyor corner turn enables the product to negotiate a change in direction up to a full 180 degree turn or to spiral upward to change heights.

Without being very costly or unsanitary, the conventional wide belts on a belt conveyor are not able to make a turn without undesirable wrinkling or displacement of the belt. Plastic or metal link conveyor belts are collapsible at the inner radius to allow a curved path, but such belting material is costly and, because of the multiple cavities defined between the links, difficult to clean.

Ease of maintenance and cleaning is important in conveyors, and is particularly so in food product applications. Health and safety regulations set standards for cleanliness which must be maintained when food products are being manufactured, packaged and transported.

Conveyors are known which employ plural, generally parallel arrangements of rubber belts which are supported on metal tables, and which make a turn by angling around rotatable pulleys mounted to the table. Such older design conveyors are generally not cleanable by current USDA standards. In addition, conveyors employing rubber belts required that the mechanism allow a belt to be installed as a preformed loop, necessitating many release catches and fasteners which are potential sites for dirt accumulation. Conveyors employing flexible urethane belting of circular cross-section have also been used. Urethane belting is particularly suited to hygienic uses because it has a smooth moisture-resistant surface which may be easily cleaned. Although flexible urethane belting may be mounted on the conveyor by welding of cut belt ends, the welding operation does require set-up and cooling time, and a certain amount of skill is required from the belt installer. Mother known conveyor loops the flexible urethane belts around pulleys which are arrayed on radial arms which cut across the conveyance path and returns the belts on an underlying array of return pulleys. Such systems, however, require welding of the belts to install them on the machine, and utilize the resilience of the urethane belting to properly achieve tension on the belts. Resilient urethane belts are stretchable, and hence will deflect downwardly as the conveyed article is supported. If the conveyed article is of too great a weight, proper belt travel may be impeded.

What is needed is a hygienic conveyor corner turn which can support moderate to heavy products and which minimizes down time by rapid changeover of new belts.

SUMMARY OF THE INVENTION

The conveyor corner turn of the present invention has a plurality of urethane belts which are preformed to the requisite length for installation. The belts may be formed with a fiber strand or metal reinforcement which renders the belts nonresilient along the length of the belt, thus greatly increasing the carrying capacity. The corner turn has an open stainless steel frame with a conveyor assembly which is supported in a cantilever arrangement to the frame support legs. This cantilever arrangement allows the preformed continuous belts to be installed, without welding, on the pulleys. The conveyor assembly has an infeed roller mounted about a horizontal axis at an infeed end and an outfeed roller mounted about a horizontal axis at an outfeed end. A plurality of looped continuous belts encircle the infeed roller and the outfeed roller to define a path for conveyed articles. An array of first corner pulleys and an array of second corner pulleys are a part of the conveyor assembly and rotate about an upwardly extending axis which is preferably inclined from the vertical. The corner pulleys are cantilevered out over return pulleys which are mounted to the frame. Each belt turns about individual corner pulleys, such that the direction of the path is changed by the corner pulleys. The rerun pulleys are radially adjustable with respect to the frame to achieve proper tension on the belts. The preformed belts may be reinforced with metal cables to support loads with minimal deflection.

It is an object of the present invention to provide a conveyor corner turn which may be easily cleaned.

It is also an object of the present invention to provide a conveyor corner turn which supports loads on plural belts with minimal downward deflection of the belts.

It is another object of the present invention to provide a conveyor corner turn in which the belts may be rapidly replaced.

It is an additional object of the present invention to provide a plural belt conveyor corner turn which is easily installed.

Further objects, features and advantages of the invention will be apparent from the following detailed description when taken in conjunction with the accompanying drawings.

BRIEF DESCRIPTION OF THE DRAWINGS

FIG. 3 is a cross-sectional view of the conveyor corner turn of FIG. 2, taken along section line 3—3.

FIG. 5 is a fragmentary top plan view of the adjustable return pulleys of the conveyor of FIG. 2.

DESCRIPTION OF THE PREFERRED EMBODIMENT

Figure 1:
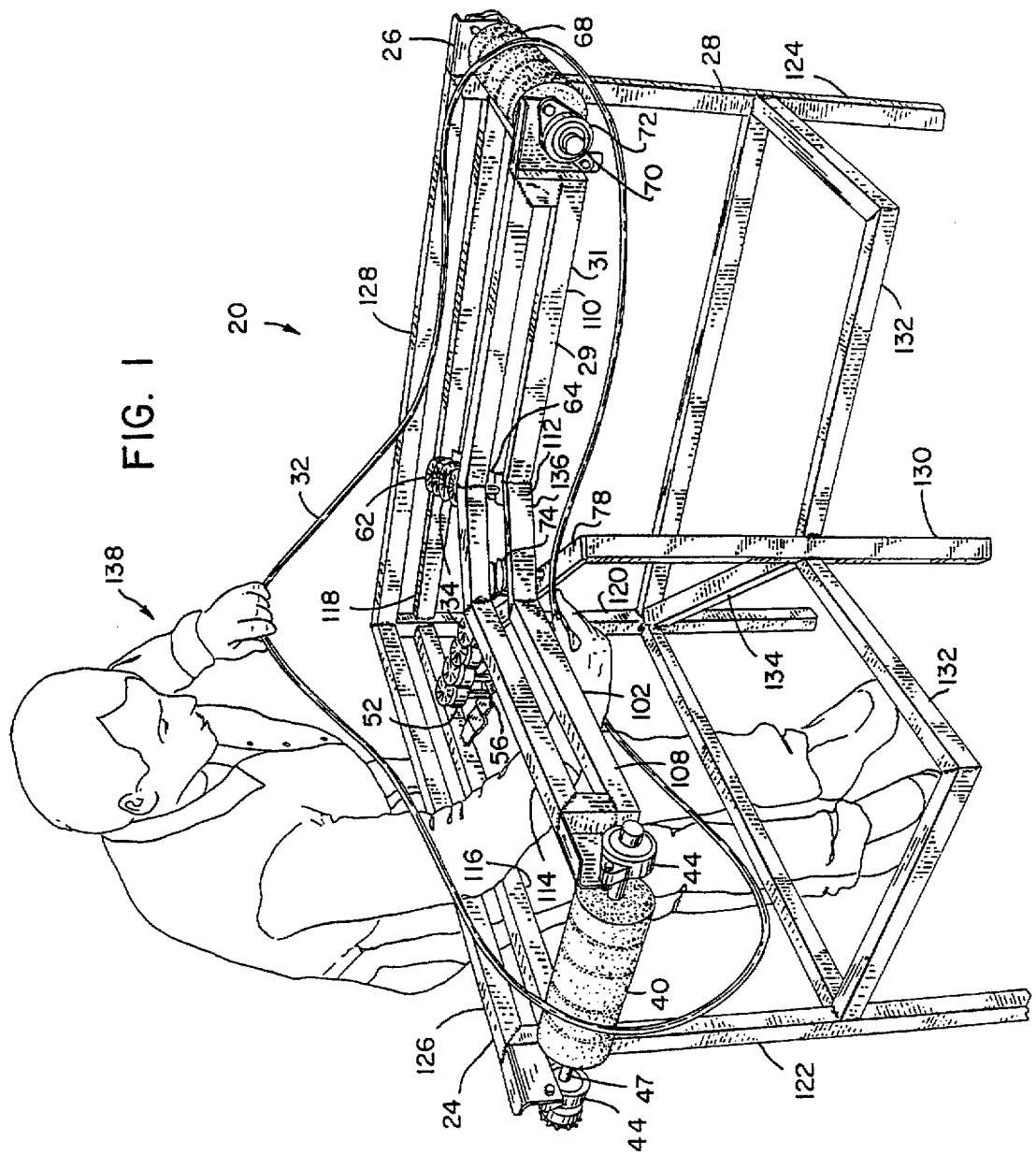
FIG. 1 is a perspective view of the conveyor corner turn of the present invention, with the installation of a belt underway.

Referring more particularly to FIGS. 1–5, wherein like numbers refer to similar parts, the conveyor corner turn 20 of this invention is shown in FIG. 1. The corner turn 20 will typically be positioned as part of a more extensive conveyor system (not shown) including straight conveyor segments which advance articles 22 to the infeed 24 of the corner turn 20 and receive articles from the outfeed 26 of the corner turn. The corner turn 20 has an open frame 28. The frame 28 includes an upper frame 29 which is part of an upper conveyor assembly 31 which is cantilevered out over support legs at a desired elevation. The cantilevered upper frame allows preformed belts 32 to be positioned on the conveyor. For food product handling the frame and legs are preferably formed of welded stainless steel. Articles 22 are conveyed around the corner turn 20 on the belts 32 which are turned by arrays of corner pulleys 34 positioned at 22.5 degrees to the infeed 24 and at 67.5 degrees to the infeed. It should be noted that other orientations and numbers of belts will also perform acceptably.

The belts 32 are preferably urethane round belting, such as that manufactured by Eagle Belting Company of Des Plaines, Ill. Urethane belting is resistant to water penetration and is easily cleaned. To resist deflection of the resilient urethane belts, the belts are preferably reinforced with a metal or fiber reinforcement which extends lengthwise within the urethane. Although pure urethane belts may be welded in place, the equipment required for fully welding a length of reinforced belting is generally fixed and too cumbersome to be used in the field. The corner turn 20, however, allows the belts to be preformed and fabricated to the size required for each corner pulley position on the turn.

In the illustrated embodiment, four continuous looped belts 32 are employed in the corner turn 20 to define a conveyor path 36. It should be noted that a corner turn with two or more paths may also be formed. Each looped belt 32 follows a similar path as it travels through the corner turn 20. At the infeed 24 a belt 32 passes over a plastic idler roller 40. For reduced friction, the idler rollers 40 are mounted on an axle 47 which turns in two bearings 44 mounted to the upper frame 29.

Figure 2:
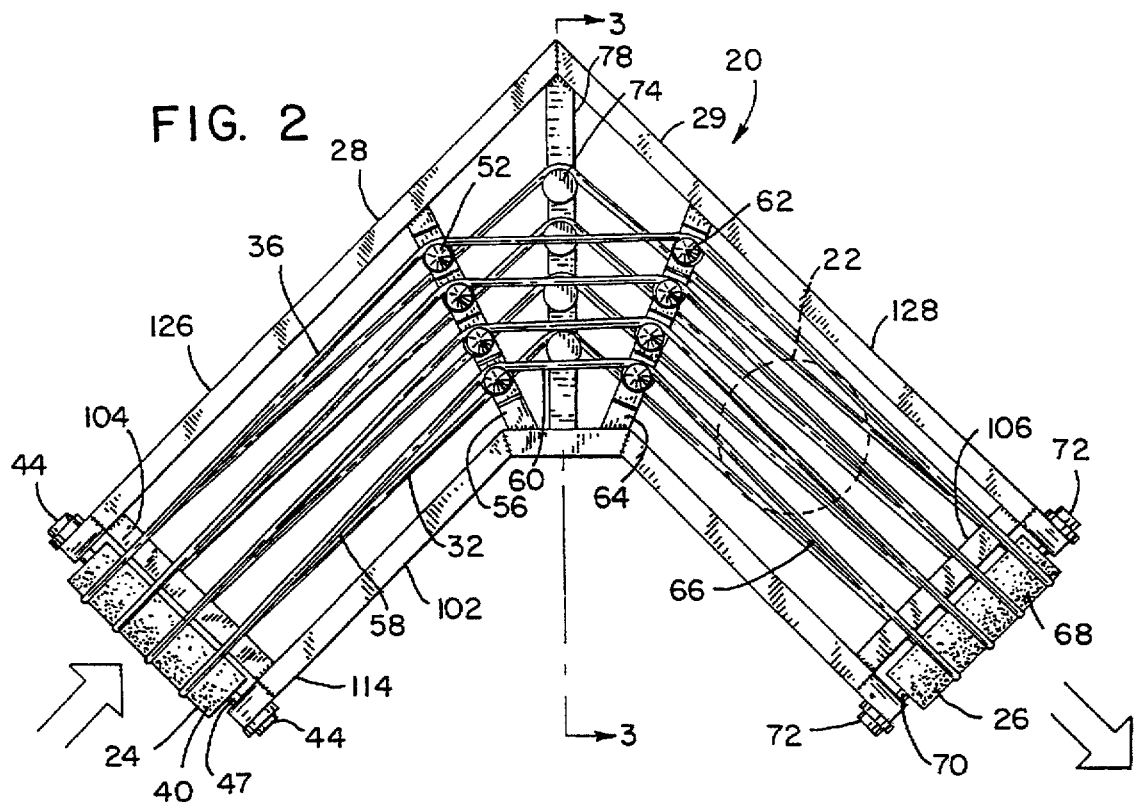
FIG. 2 is a top plan view of the conveyor corner turn of FIG. 1.

The upper frame 29 has a cantilevered portion 102, as shown in FIGS. 2 and 3. The cantilevered section is supported by an infeed crosspiece 104 which extends parallel to the infeed roller 40, and an outfeed crosspiece 106 which extends parallel to the outfeed roller 68. A generally L-shaped structure extends between the infeed crosspiece 104 and the outfeed crosspiece 106, and has two perpendicular inner members 108, 110 joined to a central attachment member 112. An L-shaped stiffening member 114 is positioned above the inner members 108, 110, and the attachment member 112. The upper frame also has two outer members 116, 118, which extend between an outer central leg 120 and an infeed leg 122 and an outfeed leg 124 respectively. Outer stiffening members 126, 128 also extend between the legs above the outer members 116, 118. The frame supports the infeed roller, the outfeed roller, and the corner pulleys at points exterior to the curved path. The legs 120, 122, 124, extend downwardly from the frame exterior to the path and engage a support surface such as a concrete floor. To prevent interference with mounting of the belts, no vertical structure extends continuously downward from the interior of the path to the support surface As best shown in FIG. 1, an inner central leg 130 is positioned below the inner attachment member 112 interior to the path, but is not connected to the upper frame 29. The inner central leg is connected to the infeed leg 122 and the outfeed leg 124 by two L-shaped members 132. The inner central leg is also connected to the outer central leg by the return pulley support bar 78, and by an angled tubular member 134. The overhanging portions of the upper frame 29 thus define a pass-through 136 above the return pulley support bar 78.

Where space permits, the conveyor assembly is preferably cantilevered from the outside of the curved path, if required by the layout needs of a particular conveyor, the conveyor assembly of the infeed roller, the outfeed roller and the corner pulleys may be supported from the interior of the curve.

As shown in FIG. 1, a belt installer 138 initially prepares the conveyor for operation by installing four preformed belts. Because each corner pulley is mounted to the cantilevered portions of the frame radially outwardly from another corner pulley, the lengths of the belts which extend around the corner pulleys will be greater the further out the corner pulley is positioned on the curved conveyor path. Each belt is formed by the manufacturer to the length to suit the corner pulleys at a certain radial position. Holding the upper run of the belt in one hand, the installer 138 brings the lower run of the belt through the pass-through 136 and underneath the upper frame 29. The upper run of the belt is positioned on two corner pulleys, and the lower run is positioned on one return pulley. As shown in FIG. 5, the return pulleys are mounted in radial slots 140 which allow them to be positioned to apply the desired level of tension. The return pulley shafts are fixed in place by adjustment of bolts 142. Thus the cantilevered portions of the frame provide a means for supporting the infeed roller, the outfeed roller, and the corner pulleys such that the continuous belts may be positioned on and removed from said rollers and pulleys without breaking the continuity of the belts. No cutting or welding of the belts is required, and hence minimal down time is observed for maintenance on the belts.

An infeed segment 58 of each belt 32 is defined between the infeed idler roller 40 and a first corner pulley 52 which is mounted on a shaft 54 which extends from a first pulley mounting bar 56 which extends at an angle of approximately 22.5 degrees from the direction of the infeed segments 58 of the belts 32. The first pulley mounting bar 56 extends between the attachment member 112 and the outer member 116. Each belt 32 extends in a turn segment 60 from a first corner pulley 52 to a second corner pulley 62 which is mounted on a shaft 54 which extends from a second pulley mounting bar 64. The second pulley mounting bar 64 extends between the attachment member 112 and the outer member 118, and extends at approximately a 45 degree angle from the first pulley mounting bar 56.

Each belt extends in an outfeed segment 66 from a second corner pulley 62 to an outfeed roller 68 mounted on an axle 70 which is supported on beatings 72 which are fixed to the upper frame 29. The belts 32 are turned around the outfeed rollers 68 and loop back to the infeed roller 40 by way of the return pulleys 74 which are mounted on shafts 76 which extend upwardly from the return pulley mounting bar 78. The return pulley mounting bar is positioned intermediate between the first corner pulley mounting bar 56 and the second corner pulley mounting bar 64.

Figure 4:
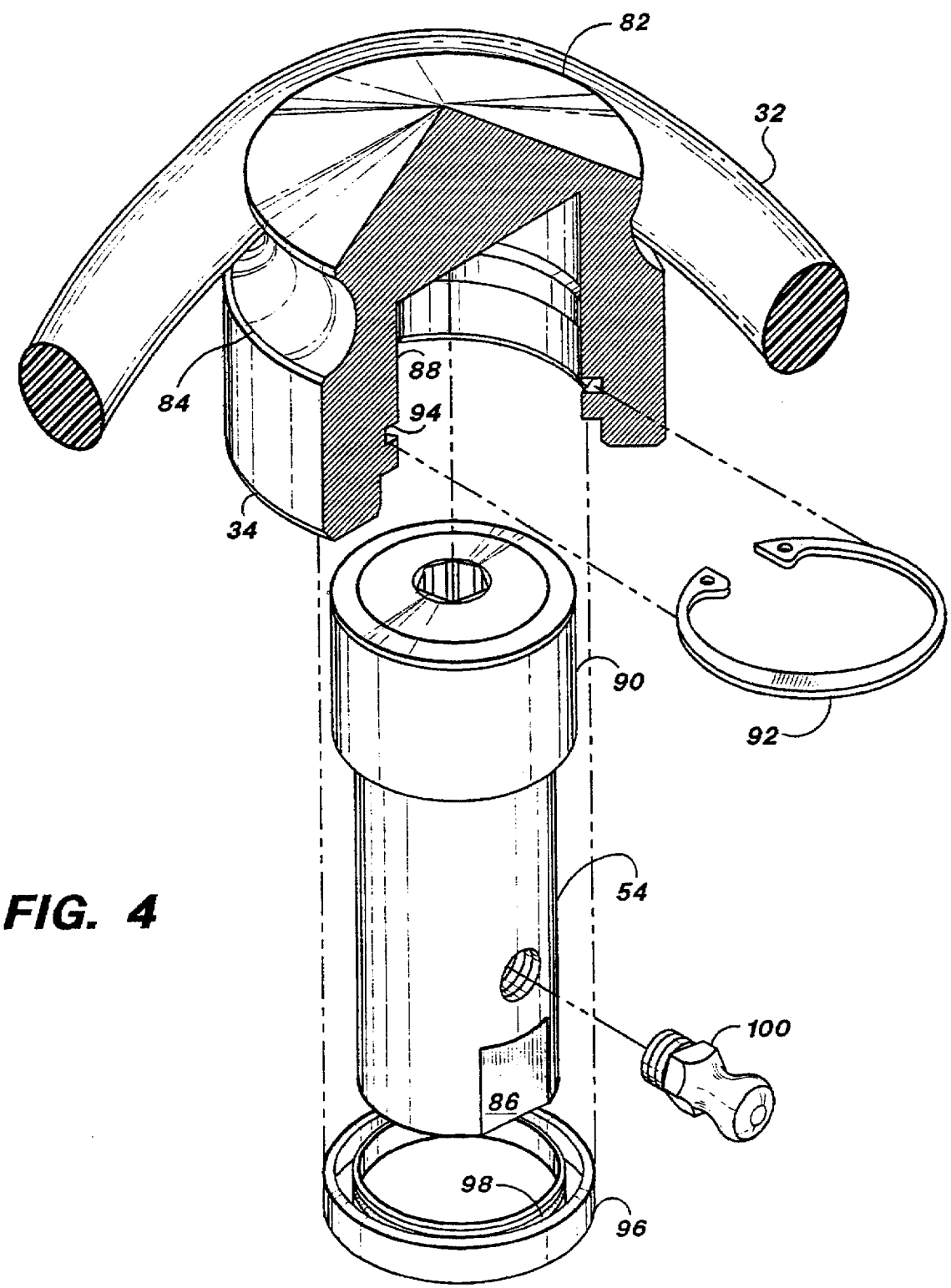
FIG. 4 is an exploded isometric view, partly broken away, of a pulley assembly of the conveyor corner turn of FIG. 1.

As shown in FIG. 3, the corner pulleys 34 are mounted to rotate about an axis which is inclined from the vertical. Each corner pulley 34, as shown in FIG. 4 is preferably formed from plastic, or may be formed of stainless steel, and has a conical top 82 above a groove 84 which encircles the pulley 34 and receives the belt 32. The inclination of the pulley shafts 54 positions the conical tops 82 of the pulleys 34 so that the portion of the top which is moving with the direction of article flow on the conveyor extends above the belt 32 and engages with an article making the turn. The portion of the pulley top 82 which is moving counter to the direction of article flow is beneath the level of the belts 32 and hence does not retard article flow. In addition, the corner pulleys 34 shield the belts 32 from engagement with the conveyed articles as the belts pass around the pulleys, which contributes to the secure engagement of the belts with the pulleys. Each of the corner pulley mounting bars 56, 64 is formed of a bent steel plate having a series of inclined segments corresponding to the position of each corner pulley shaft 54.

Any alternative support structure which positions the pulleys as desired would be acceptable.

In a preferred embodiment, the corner pulley mounting bars 56, 64, are fixed to the upper frame 29 such that the outer pulleys are elevated above the inner pulleys. By thus positioning the pulleys, the conveyor path is banked to the outside of the corner turn. This banking counteracts the tendency of articles to be flung radially outwardly in making the turn, especially at higher belt speeds.

The cylindrical shafts 54, as shown in FIG. 4 have opposed parallel surfaces 86 which engage within non-circular holes in the mounting bars 56, 64 to hold the shafts 54 rigidly and non-rotatively to the mounting bars 56, 64. As shown in FIG. 4, each pulley has a downwardly opening cavity 88 into which a thrust bearing 90 is press fit. The thrust bearing may be any conventional beating such as the Cam-follower needle type CF one and one eighth SB beating manufacturing by McGill Beating. The bearing 90 is threadedly engaged with the shaft 54. The corner pulley is retained on the bearing 90 by a snap ring 92 which is engaged within an annular slot 94 formed in the pulley cavity 88 beneath the level of the bearing 90. The bearings 90 provide for consistent and long term rotation of the pulleys while subject to the varying loads of the conveyed articles 22. Grease fittings 100 allow the bearings to be lubricated as needed.

Particularly in food industry applications, a resilient gasket 96, shown in FIG. 4, is engaged within the cavity 88 beneath the bearing 90. The gasket 96 has an inner diameter spring 98 which retains a seal about the shaft and prevents contaminants from reaching the more difficult to clean interior of the cavity 88.

Although a single set of corner pulleys may be employed to turn the belts, it is desirable to provide at least two sets for a right angle corner turn to reduce the angle which the conveyed product must turn at each pulley. By breaking the full 90 degree turn into two lesser turns, the belts are wrapped in an obtuse angle about the pulleys, facilitating smooth operation of the conveyor.

The return pulleys 74 rotate about a substantially vertical axis, as no articles are conveyed over the return pulleys. Multiple sets of return pulleys are likewise not required, as there is no need to reduce the harshness of the turn for the belts themselves.

It should be noted that although a 90 degree corner turn has been illustrated above, corner turns of 45 degrees may be formed by using only a single set of corner turn pulleys on a single mounting bar. Furthermore, corner turns of greater than 90 degrees may be formed by adding additional sets of corner turn pulleys on additional mounting bars. Such conveyor corner turns may be employed where, for example, it is required to turn a conveyor back on itself to reverse direction in a serpentine product flow. Furthermore, although the corner turn 20 may be employed as the corner of a flexible belt conveyor, it may also be used as the corner of other conveyor types, for example fabric belt or link conveyors.

Although the drive for the corner turn 20 has not been shown, either of the infeed or outfeed rollers may be connected to a drive motor, or may be in turn driven by a set of urethane belts which extend from an infeeding straight section of conveyor.

It is understood that the invention is not limited to the particular embodiments disclosed and illustrated herein, but embraces such modified forms thereof as come within the scope of the following claims.

We claim:

1. A conveyor corner turn comprising:
    a) a frame having a plurality of legs, and portions which are cantilevered out from the legs;
    b) an infeed roller mounted to the cantilevered portions of the frame;
    c) an outfeed roller mounted to the cantilevered portions of the frame;
    d) a plurality of first corner pulleys mounted to the cantilevered portions of the frame to rotate about an upwardly extending axis;
    e) a plurality of looped continuous belts which encircle the infeed roller and the outfeed roller to define a path for conveyed articles, wherein each belt turns about a single first corner pulley, such that the direction of the path is changed at the first corner pulleys; and
    f) a plurality of return pulleys mounted to the frame to extend beneath the corner pulleys, wherein each belt extends from the outfeed roller about a return pulley to the infeed roller, and the cantilevered portions of the frame support the infeed roller, the outfeed roller, and the first corner pulleys such that the continuous belts may be positioned on and removed from said rollers and pulleys without breaking the continuity of the belts.

2. The conveyor corner turn of claim 1 wherein one first corner pulley is mounted to the cantilevered portions of the frame radially outwardly from another first corner pulley, and wherein the length of one looped belt is greater than the length of another looped belt.

3. The conveyor corner turn of claim 1 wherein the frame has a return pulley support member which extends beneath the cantilevered portions of the frame, and wherein the return pulleys extend upwardly from the return pulley support member beneath the level of the first corner pulleys.

4. The conveyor corner turn of claim 3 wherein the return pulley support member has portions defining a plurality of radially extending slots, and wherein the return pulleys are mounted on shafts which extend into the slots and are positionable radially within the slots to allow adjustment of the tension on the belts which run over the return pulleys.

5. The conveyor corner turn of claim 1 wherein the belts have an internal reinforcement which extends the length of each belt.

6. A conveyor corner turn comprising:
    a) a frame;
    b) an infeed roller mounted to the frame;
    c) an outfeed roller mounted to the frame;
    d) a plurality of corner pulleys mounted intermediate between the infeed roller and the outfeed roller;
    e) a plurality of looped belts which encircle the infeed roller, the outfeed roller, and at least one corner pulley, to define a conveyor path which executes a turn;
    f) a plurality of return pulleys mounted to the frame beneath the corner pulleys; and
    g) means for supporting the corner pulleys and the infeed roller, and the outfeed roller with respect to the frame to allow the looped belts to be engaged with the return pulleys and the corner pulleys without splitting the looped belts, the supporting means comprising a frame having a plurality of legs, and a cantilevered portion which extends outwardly above the legs, the corner pulleys and the infeed and outfeed roller being mounted to the cantilevered portion above the return pulleys.

7. A conveyor corner turn comprising:
    a) a plurality of looped continuous belts which are spaced from one another to define a curved path for conveyed articles from an infeed end to an outfeed end;

b) an infeed roller at the infeed end of the path over which the belts travel;

c) an outfeed roller at the outfeed end of the path over which the belts travel;

d) a plurality of first corner pulleys positioned along the path between the infeed roller and the outfeed roller, wherein at least one corner pulley engages each belt, to cause a change in direction of said engaged belt;

e) a frame which supports the infeed roller, the outfeed roller, and the corner pulleys at points exterior to the curved path, wherein the frame has a plurality of legs which extend downwardly from the frame exterior to the path, the legs engaging a support surface, and wherein no vertical structure extends continuously downward from the interior of the path to the support surface, such that the continuous belts may be positioned on and removed from said rollers and first corner pulleys without breaking the continuity of the belts; and f) a plurality of return pulleys mounted to the frame to extend beneath the first corner pulleys, wherein each belt extends from the outfeed roller about a return pulley to the infeed roller.

8. The conveyor corner turn of claim 7, further comprising an inner central leg which is positioned inwardly of the path exterior, but which is connected to the frame exteriorly of the path by a horizontally extending member.

9. The conveyor corner turn of claim 7, wherein the frame has a cantilevered portion which is supported by an infeed crosspiece which extends parallel to the infeed roller and an outfeed crosspiece which extends parallel to the outfeed roller, and wherein a generally L-shaped structure extends between the infeed crosspiece and the outfeed crosspiece and the infeed roller and the outfeed roller are each engaged with the L-shaped structure, and the first corner pulleys are supported on a member which extends between the L-shaped structure and a portion of the frame exterior to the path.

10. The conveyor corner turn of claim 7 wherein one first corner pulley is mounted to the frame radially outwardly from another first corner pulley, and wherein the length of one looped belt is greater than the length of another looped belt.

* * * * *